July 1, 1969        G. H. MILLAR        3,452,529
WHEEL RAKE
Filed May 19, 1966        Sheet 1 of 2
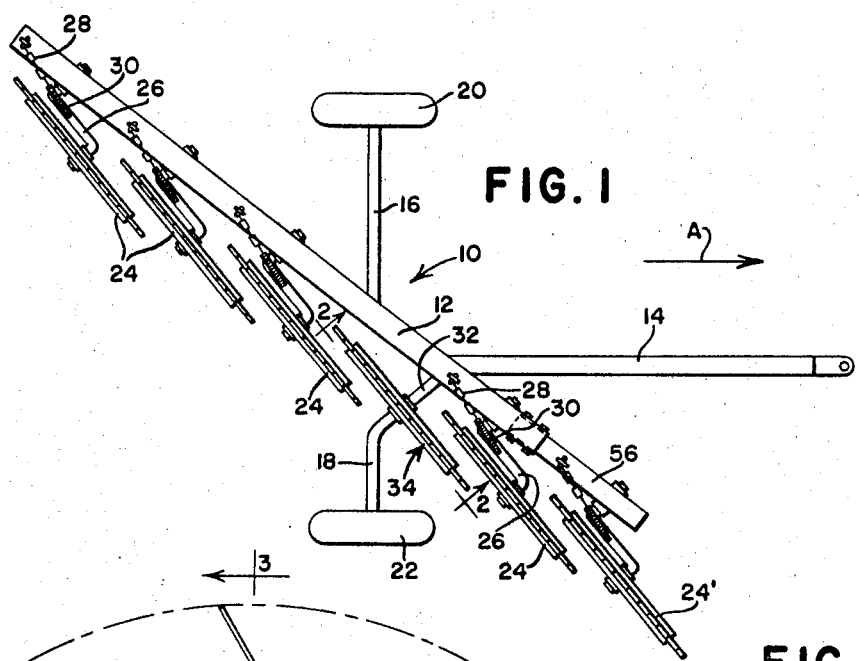
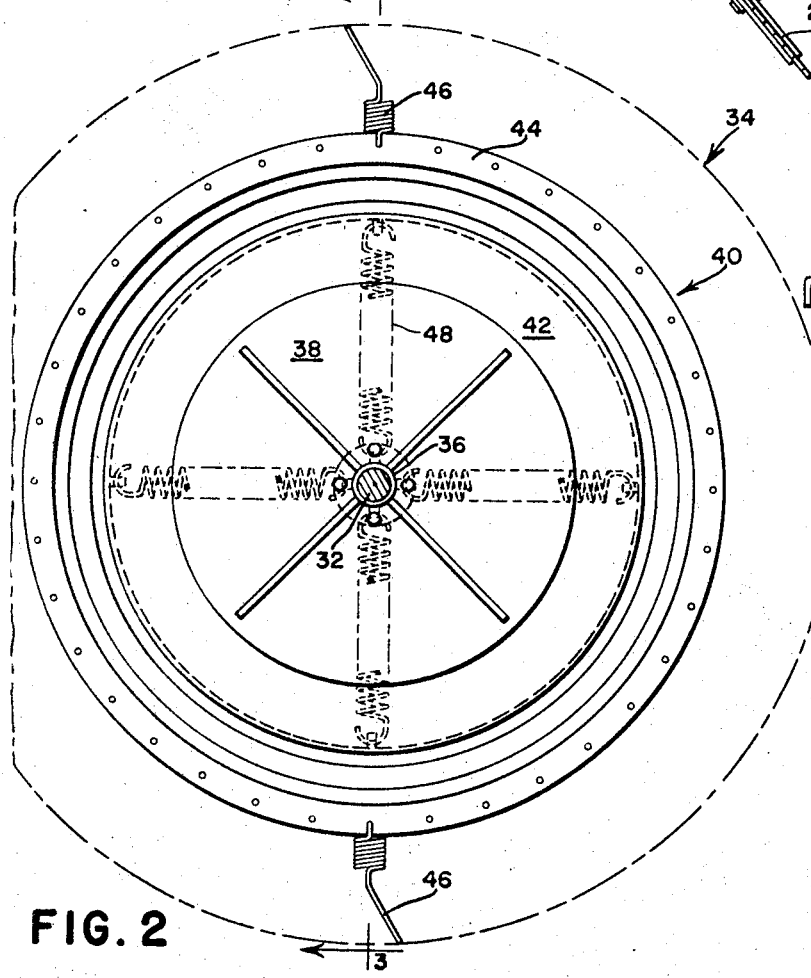
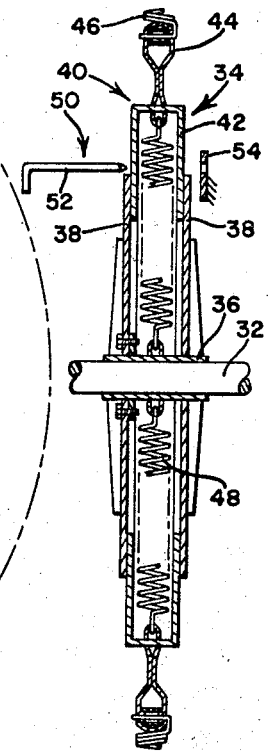
INVENTOR.
G. H. MILLAR

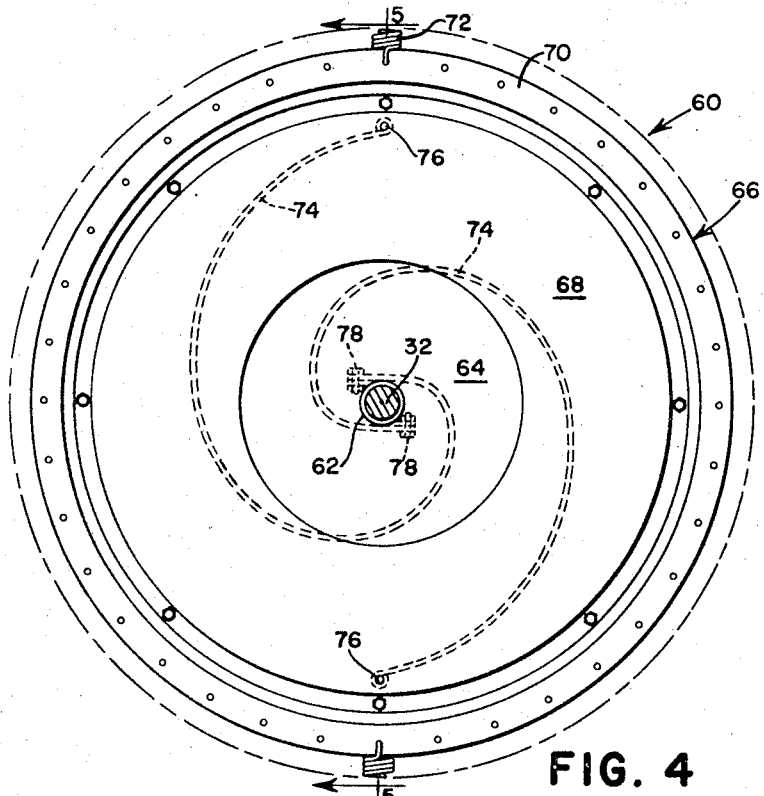
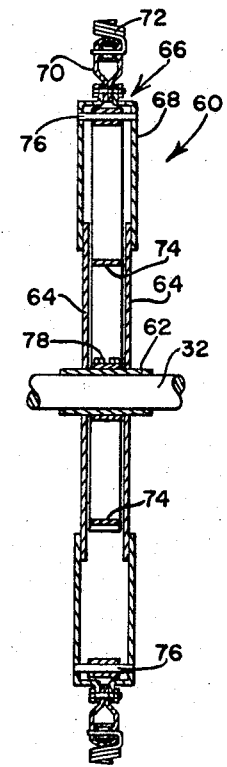
FIG. 4
FIG. 5
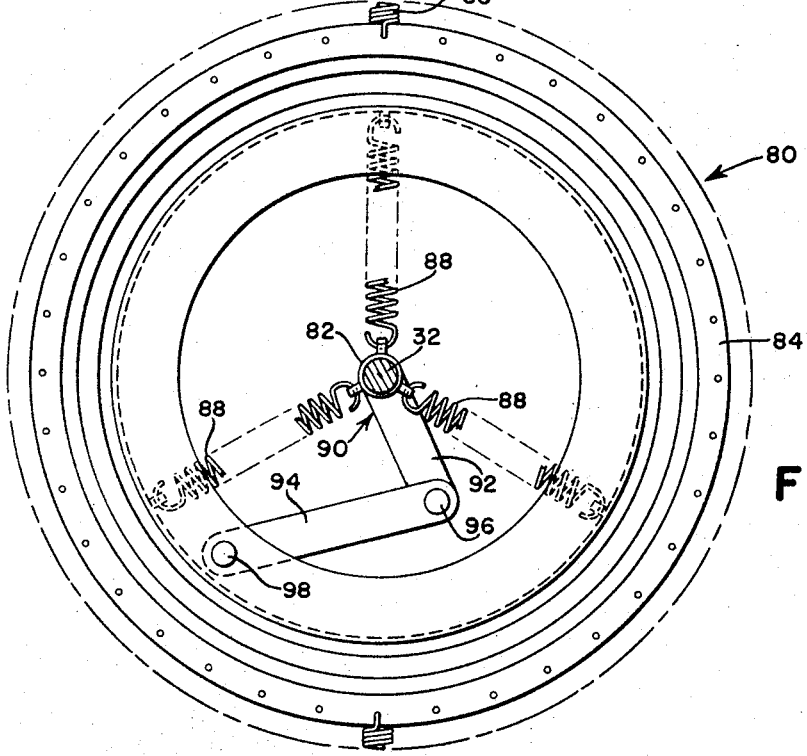
FIG. 6
INVENTOR.
G. H. MILLAR

United States Patent Office 3,452,529
Patented July 1, 1969

3,452,529
WHEEL RAKE
Gordon Halstead Millar, Moline, Ill., assignor to Deere & Company, Moline, Ill., a corporation of Delaware
Filed May 19, 1966, Ser. No. 551,297
Int. Cl. A01d 77/06
U.S. Cl. 56—377          5 Claims

ABSTRACT OF THE DISCLOSURE

A wheel-type side delivery rake has a straight horizontal beam extending obliquely relative to the machine's line of advance and a pair of wheel support elements extending laterally from opposite sides of the beam and carrying transversely aligned wheels. An echelon of rake wheels are disposed on one side of the beam member and all but one of the wheels are connected to the beam by vertically swingable arms, said one rake wheel having a hub journaled on one of the wheel support elements and an outer annular portion coaxially connected to the hub for rotation therewith by a number of springs which permit eccentric rotation of the outer portion relative to the hub.

---

This invention relates to a tractor drawn, rotary, wheel-type, side delivery rake, and more particularly to such a rake having a novel rake wheel and mounting therefor.

Wheel-type side delivery rakes are well known in the art, and conventionally include an echelon of ground-engaging, overlapping rake wheels, each rake wheel rotating about an axis oblique to the direction of machine travel as the rake advances and laterally displacing the crop lying in its path to the rearwardly adjacent rake wheel, the rearward wheel depositing the accumulated crop in a windrow. Tractor-drawn wheel rakes have conventionally included an obliquely extending beam or main frame member on which the rake wheels have been mounted, the main frame member being supported a predetermined distance above the ground by a forwardly extending draft member attached to the tractor and a pair of ground-engaging support wheels at opposite sides of the machine. The rake wheels are conventionally vertically shiftable on the frame to permit the wheels to ride on the ground and to raise upon striking an obstruction or for transport of the machine. It has been found desirable to place the support wheels in approximate transverse axial alignment intermediate the forward and rearward ends of the frame to provide a stable frame support, placing the wheels on opposite sides of the main frame. However, a conventional wheel support member for mounting the support wheel on the same side of the frame as the rake wheels would interfere with the overlapping rake wheels and various means have been provided for connecting the support wheel to the main frame or beam, such as a wheel support member arching over the rake wheels, or extending generally parallel to and between adjacent rake wheels, or extending around the end of the rake wheel echelon. However, such means have required additional frame structure, or have been difficult to manufacture, or have not been sufficiently rugged. Moreover, it has been found desirable to provide for extension of either end of the frame so that additional rake wheels may be added to optionally increase the width of the swath, and many of the previous frame configurations have rendered this extension impossible.

The primary object of the present invention is to provide a wheel-type side delivery rake having a simple and rugged frame construction, the main frame portion of which is easily extendible in either direction to accommodate additional rake wheels, and further to provide a novel rake wheel and mounting therefor which permits a frame construction. A more specific object is to provide a rake frame having a ground wheel support member extending through a rake wheel, and further to provide a novel rake wheel which is vertically adjustable on said support member to permit the rake wheel to follow the contour of the ground and be raised to transport position. Still another object is to provide a rake wheel having a hub mounted on a ground wheel support member and a rotatable outer working portion shiftable to an eccentric position relative to the hub to provide said vertical rake wheel adjustment, and further to provide spring means for connecting the working portion to the hub and biasing it toward a normal position concentric with the hub.

These and other objects will become apparent from the following detailed description and accompanying drawings wherein:

FIG. 1 is a somewhat schematic plan view of a side delivery rake embodying the invention.

FIG. 2 is an enlarged elevation view of the novel rake wheel as viewed along the line 2—2 of FIG. 1.

FIG. 3 is a section of the rake wheel viewed along the line 3—3 of FIG. 2 and schematically showing a locking device for locking the rake wheel in transport position.

FIG. 4 is an elevation view similar to FIG. 2 and showing a slightly different embodiment of the rake wheel.

FIG. 5 is a section taken along the line 5—5 of FIG. 4.

FIG. 6 is an elevation view similar to FIGS. 2 and 4 and showing a third embodiment of the rake wheel.

The rotary side delivery rake illustrated in FIG. 1 includes a mobile rake frame 10 having a relatively horizontal main frame or beam member 12 extending obliquely relative to the direction of machine travel, indicated by the arrow A. The rake frame 10 also includes a draft member 14 extending forwardly from the beam member 12 and connectible at its forward end to a draft vehicle, conventionally an agricultural tractor. Also connected to the beam member 12 are left and right wheel support members 16 and 18 respectively, extending laterally from opposite sides of the beam member 12 and journaling left and right ground-engaging wheels 20 and 22 respectively, the beam member 12 being supported in a generally horizontal condition a predetermined height above the ground by the support wheels 20 and 22 and the draft member 14 when it is connected to the draft vehicle.

A plurality of axially parallel rake wheels 24 of conventional construction are respectively journaled on one end of a plurality of crank arms 26, the opposite ends of the crank arm 26 being pivotally mounted on the beam member 12 for swinging of the crank arms in generally vertical arcs about parallel horizontal axes, so that the rake wheels 24 are vertically adjustable relative to the beam member 12 about the crank arm pivots. Each rake wheel 24 normally rides on the ground during operation of the rake, although its downward movement is limited by an adjustable strap 28 having one end attached to the beam member 12 and the other end attached to the crank arm 26, each strap 28 including a tension spring 30, which partly counterbalances the weight of the rake wheel 24 and crank arm 26, so that the rake wheel rides lightly on the ground during operation of the rake. The length of each strap 28 is conventionally adjustable, so that the straps 28 may be utilized to support the crank arms 26 in a raised position wherein the rake wheel clears the ground, facilitating transport of the rake.

The right wheel support member 18 includes a cylindrical portion 32 adjacent the beam member 12 and substantially parallel to the crank arm pivots. A rake wheel 34, having a different construction than the rake wheels 24, is journaled on the horizontal cylindrical portion 32 and together with the rake wheels 24 forms an echelon of axially parallel overlapping rake wheels, which are rotated by means of their engagement with the ground as the machine advances to laterally displace any crop lying in their path to the rearwardly adjacent rake wheel.

The rake wheel 34 includes a sleeve-like hub portion 36 rotatably mounted on the wheel support portion 32 and coaxially carrying a pair of axially spaced annular disks 38. The rake wheel 34 also includes an annular outer or working portion 40, including an annular member 42 having a U-shaped cross section open toward the rake wheel axis and an annular tine supporting member 44, attached to the periphery of the member 42 and carrying a plurality of radially extending rake tines 46 equally spaced at relatively close intervals around the rake wheel periphery. The annular member 42 is sandwiched between the disks 38 and is radially shiftable to an eccentric position relative to the hub portion 36. The hub portion and the outer portion 40 are biased toward a coaxial position and interconnected by a plurality of radially extending helical-type tension springs having one end attached to the hub portion 36 and their opposite end connected to the bight portion of the U-shaped annular member 42, the springs 48 being equally spaced angularly and being deflectable to permit eccentric rotation of the annular outer portion 40 relative to the wheel support portion 32.

The wheel support portion 32 is located so that the outer or working portion 40 is substantially coaxial with the portion 32 during normal operation of the rake with the lowermost tines riding lightly on the ground. The outer portion 40 is shiftable against the bias of the springs 48 to an eccentric position so that it may follow the contour of the ground or raise to clear any obstruction on the ground. The sandwich-type construction of the rake wheel prevents the outer portion 40 from cocking relative to the hub 62 during operation of the rake. The outer portion 40 may also be raised to an elevated eccentric position and locked therein by a locking means 50, including a pin 52 engaging the outer periphery of the disks 38 and the inner periphery of the member 42 and insertable into a receptacle 54 rigidly connected to the frame 10, the insertion of the pin between the disks and the member 42 being possible only when the outer portion 40 is substantially raised relative to the hub portion 36.

As is apparent from FIG. 1, the rake frame 10 has a simple construction, the extension of the right wheel support member 18 through the rake wheel 34 avoiding the necessity for a rake frame member extending over or between the rake wheels or extending around either end of the echelon of the rake wheels. Since the main frame or beam member 12 is open at both ends, the width of the rake can be simply increased by adding a beam extension 56 to either or both ends of the beam member 12, one or more additional rake wheels 24' being attached to the beam extension 56 in the same manner that the rake wheels 24 are attached to the beam member 12.

A slightly different rake wheel 60 for mounting on the horizontal portion 32 of the right wheel support member 18 is shown in FIGS. 4 and 5, the rake wheel 60 including a sleeve-like hub portion 62, rotatable on the wheel support portion 32, and a pair of axially spaced disk members 64 coaxially attached to the hub portion 62. An annular outer rake wheel portion 66 includes an annular member 68 having a U-shaped cross section open toward its axis, the disk members 64 being mounted in a telescoping relationship between the opposite sides of the annular member 68, maintaining the annular outer portion 66 axially parallel to the hub portion 62 while permitting radial shifting of the outer portion 66 for eccentric rotation of the outer portion relative to the horizontal wheel support portion 32. An annular tine supporting member 70 is coaxially attached to the outer periphery of the member 68 and carries a plurality of radially extending rake teeth or tines 72, only a portion of which is shown in the drawings. The annular outer portion 66 is connected to the hub portion 62 by a pair of spiral flat springs 74 having one end attached to the outer portion 66 by pins 76 and their opposite end attached to the hub portion 62 by fasteners 78. The springs 74 bias the outer portion 66 toward a concentric position with the hub portion 62 and deflect to permit eccentric rotation of the outer portion, whereby the rake wheel will follow the contour of the ground during operation of the rake.

A third embodiment of the rake wheel mounted on the horizontal portion 32 of the right wheel support member 18 is shown in FIG. 6 and is indicated in general by the numeral 80. The rake wheel 80 again includes a sleeve-like hub portion 82 and an annular outer portion 84 carrying a plurality of radially extending rake tines 86, only a portion of the rake tines being shown. The hub portion 82 and the annular outer portion 84 are connected by a plurality of equally spaced, radially extending tension springs 88, having one end connected to the hub portion 82 and their other end connected to the outer portion 84, the springs again biasing the rake wheel portions 82 and 84 toward a coaxial position and being deflectable to permit eccentric rotation of the outer portion 84 relative to the hub portion 82. The two rake wheel portions are maintained in an axially parallel condition by a double-link-type guide means 90, rather than the sandwich-type or telescoping construction utlized in the previously described rake wheels. The guide means 90 includes an inner link member 92, connected at one end to the hub portion 82, and an outer link member 94, the link members being interconnected at their ends by a pivot pin 96, the outer link 94 being connected at its other end to the annular outer portion 84 by means of a pivot pin 98, the pivots 96 and 98 both being axially parallel to the hub portion 82. The knee action of the guide means 90 permits shifting of the outer portion 84 relative to the hub portion 82 in a radial direction only, so that the outer portion 84 may rotate eccentrically and follow the contour of the ground while it is prevented from cocking relative to the hub portion 82.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A side delivery rake comprising: a main frame adapted to advance over a field and including a horizontal relatively straight main frame member extending obliquely relative to the direction of machine travel, a draft element extending forwardly from the main frame member, and first and second wheel support elements extending from the main frame member toward opposite sides of the machine; a pair of ground-engaging wheels respectively journaled on the first and second wheel support elements on opposite sides of the frame for supporting the main frame member a predetermined distance above the ground; a plurality of lever means pivotally mounted on the main frame member for vertical swinging movement about parallel horizontal axes; a rake wheel mounted on each lever means for rotation about its axis, the axes of the respective rake wheels being offset from the pivot axes of the respective lever means to permit vertical adjustment of the rake wheels relative to the frame in response to swinging of the lever means; and a deflectable rake wheel disposed axially parallel to and on the same side of the main frame member as the other rake wheels to form an echelon of generally parallel rake wheels, said deflectable rake wheel including a hub portion journaled on the wheel support element disposed on the same side of the main frame member as the rake wheels, a rigid annular outer portion having a plurality of radial rake teeth, and spring means operatively connecting the hub portion to the annular outer portion for rotation of said portions in unison and biasing the outer portion toward a generally coaxial position relative to the hub, the spring means being deflectable to permit eccentric rotation of the annular outer portion relative to the hub portion.

2. The invention defined in claim 1 and including locking means selectively engageable with said annular outer portion to lock it in a raised eccentric position relative to the hub portion.

3. The invention defined in claim 1 wherein the hub portion has a larger outer diameter than the inner diameter of the annular outer portion, said portions being mounted in an overlapping relationship and telescoping during eccentric rotation of the annular portion.

4. The invention defined in claim 1 wherein the spring means comprises a plurality of radially extending equally spaced helical tension springs, having one end attached to the hub portion and their opposite end attached to the annular portion.

5. The invention defined in claim 1 wherein the spring means includes a plurality of flat springs having their inner ends attached to the hub portion as equal angular intervals, and their opposite ends attached to the annular outer portion at similar equal angular intervals.

References Cited

UNITED STATES PATENTS

| | | | |
|---|---|---|---|
| 1,221,053 | 4/1917 | Hopson | 152—97 |
| 1,289,517 | 12/1918 | Musselman | 152—85 |
| 1,295,316 | 2/1919 | Hines | 152—85 |
| 1,336,031 | 4/1920 | Gebhardt | 152—85 |
| 1,443,478 | 1/1923 | Kouach | 152—85 |
| 2,844,935 | 7/1958 | Cooley | 56—377 |
| 2,945,339 | 7/1960 | Van Der Lely et al. | 56—377 |
| 2,972,852 | 2/1961 | Van Der Lely et al. | 56—377 |
| 3,006,132 | 10/1961 | Van Der Lely et al. | 56—377 |
| 3,221,822 | 12/1965 | Dedoes | 172—22 |

FOREIGN PATENTS

| | | |
|---|---|---|
| 103,529 | 1/1963 | Netherlands. |
| 247,457 | 5/1963 | Australia. |

ABRAHAM G. STONE, *Primary Examiner.*

P. A. RAZZANO, *Assistant Examiner.*